DOUBLE TIME CONSTANT AUTOMATIC VOLUME CONTROL CIRCUIT

Filed Oct. 25, 1947

INVENTOR.
JOHN W. HAYWARD
BY
Brown, Denk & Synnestvedt
AGENTS

Patented Feb. 28, 1950 2,498,839

UNITED STATES PATENT OFFICE 2,498,839

DOUBLE TIME CONSTANT AUTOMATIC VOLUME CONTROL CIRCUIT

John W. Hayward, Philadelphia, Pa., assignor to Philco Corporation, Philadelphia, Pa., a corporation of Pennsylvania Application October 25, 1947, Serial No. 782,209

2 Claims. (Cl. 178—7.3)

Figure 1:
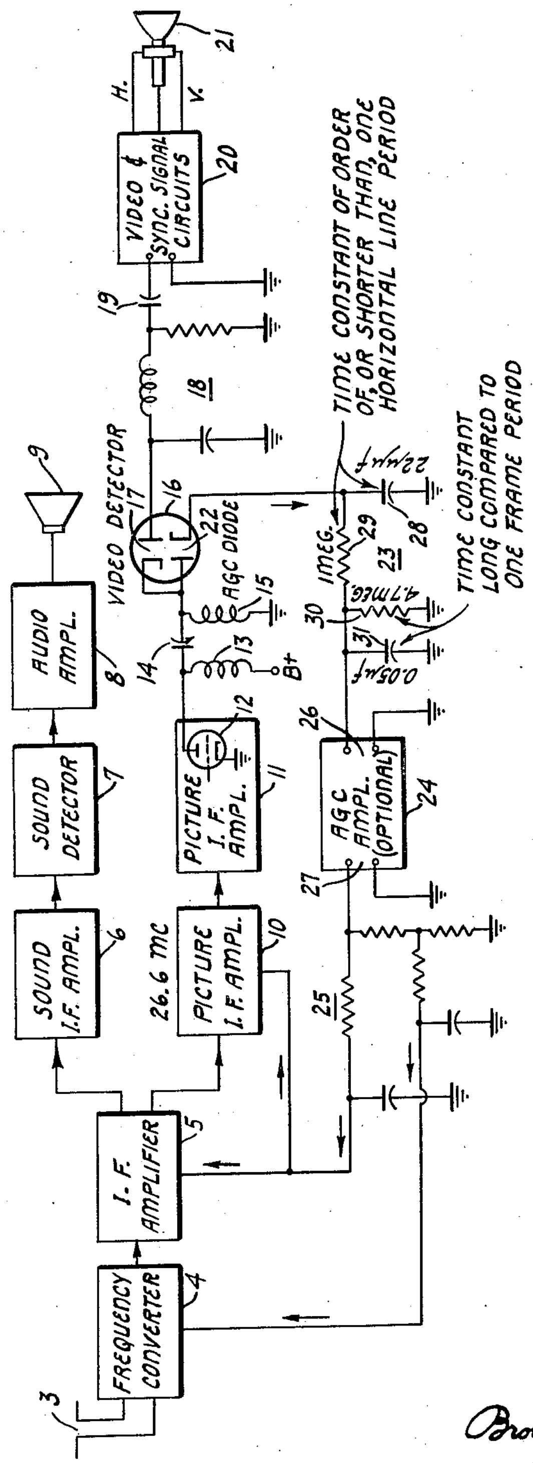

The invention herein described and claimed relates to television receivers, and, more particularly, to a television receiver having an improved automatic gain control circuit.

In television receivers, the provision of a reliable automatic gain control circuit is of considerable importance, substantially more so than it is in conventional sound broadcast receivers. In a television receiver the automatic gain control circuit not only is relied upon to maintain the sound output of the system relatively independent of received signal strength, but also to maintain the video or picture-signal amplitude at a level providing a desired degree of picture contrast. Perhaps even more importantly, the automatic gain control system is relied upon to maintain the composite video signal level relatively constant at the point where the receiver's pickoff circuits derive horizontal and vertical synchronizing pulses from the composite signal. While most well-designed synchronizing signal pickoff circuits are adapted to function over a reasonably substantial range of applied signal amplitudes, it is nevertheless true that such circuits function best when provided with signals of a predetermined amplitude. Particularly in the presence of strong noise signals it is important that the composite video signals applied to the synchronizing signal pickoff circuits be maintained at the appropriate level in order that the circuits may perform most efficiently.

One of the principal objections to previously known automatic gain control circuits is that they have a tendency to be disturbed, to a deleterious extent, in the presence of strong, intermittent noise impulses. A satisfactory automatic gain control system should develop a direct-current gain-control potential whose magnitude is a direct function of the synchronizing signal amplitude, an amplitude which can be taken as indicative of received signal strength. Such a voltage is usually developed, and is developed in the present instance, by means of a diode rectifier circuit which levels on the synchronizing pulse tips. In conventional arrangements, however, it is found that such circuits tend also to level on the peaks of strong noise pulses accompanying the desired signal. The result of this behavior is to produce an automatic gain control voltage whose magnitude is not truly indicative of received signal strength, but indicative rather of the amplitude of received noise impulses. Accordingly the automatic gain control voltage of these prior systems tends to vary erratically in accordance with the presence of strong noise impulses. This, in turn, varies the gain of the television receiver in such manner as to produce substantial variations in the level of the composite video signal. This is undesirable in itself, but in addition the synchronizing signal pickoff circuits which, as indicated above, are best adapted to perform their function at a predetermined signal level, are forced to perform their pickoff operation under conditions not conducive to optimum performance. Under severe, intermittent noise conditions the automatic gain control voltage may reach such proportions that the gain of the receiver is reduced to a point where the pickoff circuits fail to discharge their assigned function. In this event there results a loss in synchronism between the deflecting circuits of the receiver and those at the transmitter. In television receivers installed in electrically noisy locations, the foregoing difficulty imposes a considerable limitation upon the operation and performance of the receiver, and since such locations are frequently met with in downtown city and industrial areas, it is important that the receiver be adapted, if possible, to operate satisfactorily under the conditions set forth.

Accordingly it is a principal object of the present invention to provide an improved automatic gain control system particularly adapted for use in television receivers.

It is another object of the present invention to provide an improved automatic gain control circuit for use in television receivers, which circuit is capable of developing an automatic gain control voltage which is truly indicative of the amplitude of the received television signal, and which is substantially free from the disturbing effects of strong, intermittent noise signals.

Figure 2:
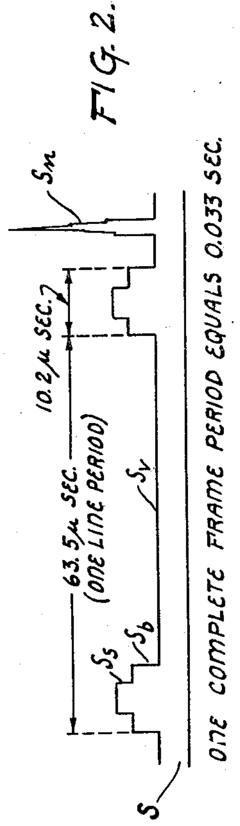

These and other objects of the invention, and the manner in which they are attained, will appear from the following detailed description and the accompanying drawing in which Fig. 1 is a schematic diagram of a preferred embodiment of the invention; and Fig. 2 is an explanatory diagram illustrating certain time intervals which are of significance in determining optimum circuit proportions.

Reference may now be had to Fig. 1 in which there is illustrated, schematically, the essentials of a television receiver embodying the present invention in its preferred form. Since most of the components illustrated are entirely conventional, a brief preliminary description of these components will suffice. The television receiver illustrated comprises, inter alia, a suitable antenna 3, a frequency converter stage 4, and an intermediate frequency amplifier 5 having separate output circuits for the sound intermediate frequency carrier and for the picture intermediate frequency carrier. The sound carrier is applied to a conventional sound intermediate frequency amplifier 6 which is followed by the sound detector 7, the audio frequency amplifier 8, and the loudspeaker 9. The picture carrier output of amplifier 5 is applied to the picture, or video, intermediate frequency amplifier stage 10, the output of which is applied to a further intermediate frequency stage 11 which includes a suitable amplifier tube 12. The output signal of the amplifier 12 is developed across the tube's anode load circuit 13 and is applied, by way of the coupling capacitor 14 and the inductor 15 to a double-diode 16 functioning as a video signal detector and as an automatic gain control device. The upper diode element 17 cooperates, in conventional manner, with the diode load network 18 to develop a detected video signal voltage which is applied, by way of a coupling capacitor 19, to the usual video frequency amplifier, synchronizing signal pickoff circuits, and deflection signal generators, all of which, in the drawing, are represented diagrammatically by the block 20. The amplified video frequency signal, and the horizontal and vertical deflection currents developed in the circuits of device 20 are applied in conventional manner to a suitable picture reconstituting device 21. As described thus far the system is entirely conventional and accordingly a more detailed description of the foregoing elements is deemed unnecessary for the present purposes.

The automatic gain control system illustrated in Fig. 1 comprises the lower diode element 22 of double-diode 16, the diode load network 23, the automatic gain control voltage amplifier 24 (the use of which is entirely optional), and the filter networks 25 by way of which automatic gain control voltages of suitable amplitude may be applied, in conventional manner, to the gain control elements of the frequency converter 4, intermediate frequency amplifier 5, and the video intermediate frequency amplifier 10. If an automatic gain control voltage amplifier 24 is employed, it may conveniently take the specific form disclosed in the copending application of Sterling C. Spielman, Serial No. 731,757, filed March 1, 1947, and assigned to the assignee of the instant invention.

The novelty of the present invention resides principally in the circuit configuration, and in the values, assigned to the circuit elements comprising the diode load network 23. As will be seen hereinafter, the time constants provided by the several branches of this network are related in a particular manner to certain time intervals occurring in the received television signal.

Referring now more specifically to the automatic gain control circuit it will be noted that the amplified video intermediate frequency voltage is applied to the anode of the diode element 22, the diode load network 23 being connected to the cathode thereof. The unidirectional voltage developed at the cathode of diode 22, and hence at the output terminals 26 of the network 23, will be of positive polarity with respect to ground. This has nothing to do with the invention per se, but is necessitated, in this particular embodiment, because of the fact that the amplifier 24 introduces a polarity reversal and hence it was necessary to develop a positive automatic gain control voltage so that the voltage available at the output terminals 27 of the amplifier 24 would be negative in polarity and hence suitable for application to the usual gain control electrodes of the gain-control stages 4, 5 and 10. Where a gain control voltage amplifier is not employed it will, of course, be apparent to those skilled in the art that the anode and cathode elements of diode 22 would be relatively reversed. The diode network 23 comprises a first shunt capacitor 28 connected between the cathode of the diode 22 and ground (chassis), a series resistor 29, a shunt resistor 30 and a shunt capacitor 31. The automatic gain control voltage developed by the automatic gain control circuit appears across the capacitor 31, the terminals of which represent the output terminals of the automatic gain control circuit.

The automatic gain control circuit generally employed prior to the present invention comprised only the diode 22 in combination with the resistor 30 and the capacitor 31, these elements being connected in shunt relation between the cathode of the automatic gain control diode 22 and ground.

In order that the automatic gain control voltage be substantially independent of the normal variations occurring within one frame of the television picture signal it is important that the principal diode load circuit 30—31 have a time constant which is long compared to the time of one frame of the video picture, the latter being one-thirtieth of a second under the present United States television standards. In the arrangement illustrated the values suggested by way of example, namely 4.7 megohms and 0.05 $\mu$f., provide a time constant somewhat in excess of two-tenths of a second.

Where the diode load circuit comprises only the elements 30 and 31, erratic behavior of the automatic gain control circuit has been traced to the fact that noise signals having an amplitude substantially in excess of the maximum peak signal amplitude tend to "capture" the automatic gain control circuit with the result that the voltage delivered thereby may, periodically, be more indicative of the amplitude of the noise signal than of the desired picture signal. Since the magnitude of the noise signal tends to fluctuate very widely the result is an automatic gain control circuit whose output voltage is highly variable in magnitude. The consequence of this is a video signal whose amplitude fluctuates over undesirably wide limits, and whose synchronizing signal pickoff circuits are made inefficient by the delivery thereto of a composite video signal whose amplitude is substantially less than that for which the pickoff circuits were designed.

Fortunately, however, there is a distinction between the received television signal and the accompanying noise impulses which may be utilized to provide an automatic gain control voltage whose magnitude is substantially independent of the periodic presence of short, high-amplitude noise impulses. In Fig. 2 there is represented the amplitude-versus-time plot of a television signal S employing the present signal standards. The signal comprises a video signal interval $S_v$, a blanking signal portion $S_b$, and a synchronizing signal portion $S_s$. The blanking signal interval has a duration of approximately 10.2 microseconds, while the interval occupied by the video signal portion and the blanking signal portion (one line period) is approximately 63.5 microseconds. A typical, high-amplitude, noise impulse $S_n$ is represented superimposed on the video signal to the right of the second synchronizing pulse. It has been found that in prior art automatic gain control circuits employing only the load elements 30—31, the developed A. G. C. voltage is determined by the peak value of a given, high-amplitude noise impulse, the capacitor 31 being charged to the peak noise amplitude. Since the time constant of this circuit is necessarily long, this spurious noise-induced gain-control voltage remains for an appreciable period of time and may reduce the gain of the receiver to an undesirably low value for a period equal to many line intervals. Aside from its undesirable effect of reducing the picture contrast during this period, the resultant loss in video signal may be so substantial as to interfere with the proper functioning of the synchronizing signal pickoff circuits, and should further noise be experienced within this period of reduced gain the pickoff circuit may fail to function properly and synchronism may be lost.

The foregoing difficulties are substantially eliminated, and in any event greatly minimized, by the provision of the auxiliary diode load elements 28—29. The choice of time constant of these added elements is, however, of considerable importance. In general, the time constant of the circuit 28—29 should be shorter than the time of a few horizontal line periods; and preferably the time constant should be less than one horizontal line period which, under the presently existing standards, is approximately 63.5 microseconds (see Fig. 2). Since the capacitance 31 is very large compared to the capacitance 28, the time constant of the circuit comprising the elements 28 and 29 is determined very precisely by the product of the resistor 29 and the capacitor 28, without regard to the presence of the shunt RC circuit 30—31. In the circuit illustrated, and employing the values indicated thereon, the time constant of the circuit 28—29 will be seen to be 22 microseconds which is substantially less than the line period.

During the development of the circuit illustrated in Fig. 1, a capacitor 28 was employed having a capacity of 220 $\mu\mu$f. which, in combination with the resistor 29, yielded a time constant of 220 microseconds, a time considerably in excess of one single line period. While some improvement over the prior art arrangement was noted, it was found that short noise impulses of high amplitude and having durations of only a few microseconds acted to produce at the output terminals of the network 23, spurious voltage surges of high amplitude having a duration of approximately 220 microseconds. While this represented a time reduction over that previously obtained it was apparent that the automatic gain control continued to lengthen, effectively, the duration of the interfering noise impulses, and increased to a very undesirable extent, the magnitude of the automatic gain control voltage. When, however, the capacitor 28 was reduced to 22 $\mu\mu$f. (yielding a time constant of 22 microseconds) a very marked improvement in operation was obtained, sharp noise impulses having very small effect on the magnitude of the automatic gain control voltage appearing at the output terminals of network 23.

Perhaps the action of the improved circuit can best be understood from the following consideration. Rectified noise impulses passing through the diode element 22 act to charge the capacitor 28 to the peak rectified voltage level. The capacitor 28, however, being of very small capacity derives only a small charge from this voltage and this charge passes off through the resistor 29 and into the much larger capacitor 31 whose terminal voltage is affected only to a negligible extent by the small charge contributed by the small capacitor 28. In the normal operation of the system the capacitor 28 derives a small charge from each of the synchronizing pulse tips and supplies this charge, by way of resistor 29, to the capacitor 31 which, in combination with the resistor 30, has a time constant which is large compared to one frame (approximately two-tenths of a second versus one-thirtieth of a second). No individual charge received from the small capacitor 28, however, is of sufficient magnitude to affect to any considerable degree the voltage across the capacitor 31. Even when the capacitor 28 is charged, by a high-amplitude noise impulse, to a value many times that to which it is normally charged by the synchronizing pulses, there is insufficient energy in the charge to increase the voltage across the capacitor 31 to any substantial degree.

From the foregoing it will be apparent that the improved automatic gain control of the present invention owes its superiority over prior circuits primarily to the provision of a diode load network having a plurality of RC circuits, the first, (i. e. that connected directly to the diode) having a time constant which is, preferably, less than the time of one horizontal line, and the second RC circuit having a time constant which is long compared to a single frame. The performance of such a circuit under severe noise conditions has been found to be far superior to that provided by a conventional automatic gain control circuit employing the elements 30—31 only.

It is to be understood that the specific values employed are not highly critical, and that the values indicated by way of example in the drawing are for purposes of illustration only. These specific values have, however, been found to yield good results and are those employed in television receivers presently manufactured by the assignee of the instant invention. The invention contemplates, of course, such changes and modifications as may come within the scope of the appended claims.

I claim:

1. In a television receiver adapted to receive a television signal having predetermined line and frame periods, an automatic gain control circuit comprising: a rectifier element; a $\pi$-type load network for said rectifier element, the input shunt arm of said network comprising a capacitance $C_1$, the series arm of said network comprising a resistance $R_1$, and the output shunt arm of said network comprising a capacitance $C_2$ and resistance $R_2$ in parallel relation; the product $R_1C_1$ being greater than the horizontal blanking interval but substantially less than one horizontal line period, while the product $R_2C_2$ is greater than one frame period; means for applying a carrier wave to said rectifier element, said carrier wave being amplitude modulated with both picture and synchronizing intelligence; and means for utilizing the rectified voltage developed across the output shunt arm of said network for controlling the gain of said television receiver.

2. The combination claimed in claim 1, characterized in that the product $R_1C_1$ is of the order of 20 microseconds.

JOHN W. HAYWARD.

(References on following page)

REFERENCES CITED

The following references are of record in the file of this patent:

UNITED STATES PATENTS

| Number | Name | Date |
|---|---|---|
| 2,194,278 | George | Mar. 19, 1940 |
| 2,226,994 | Schlesinger | Dec. 31, 1940 |
| 2,240,507 | Lewis | May 6, 1941 |
| 2,259,520 | Freeman | Oct. 21, 1941 |
| 2,402,096 | Somers | June 11, 1946 |

FOREIGN PATENTS

| Number | Country | Date |
|---|---|---|
| 845,897 | France | Sept. 4, 1939 |